Aug. 2, 1927.

W. STOECKICHT

SHAFT COUPLING

Filed Oct. 1, 1925

1,637,663

Inventor:
Wilhelm Stoeckicht
By
Attorney.

Patented Aug. 2, 1927.

1,637,663

UNITED STATES PATENT OFFICE.

WILHELM STOECKICHT, OF MUNICH-SOLLEN, GERMANY.

SHAFT COUPLING.

Application filed October 1, 1925, Serial No. 59,903, and in Germany, October 13, 1924.

This invention concerns improvements in or relating to couplings for transmitting rotary motion between two shafts having the same or approximately the same axial direction, and more particularly to couplings of the type in which, in contradistinction to that type of device having balls interposed between coupling members for the purpose of allowing a universal movement of the latter, the coupling members on the ends of the shafts to be coupled together being provided with race surfaces co-operating with balls or like rolling members for the purpose of producing an axial force in one of the shafts during the transmission of rotary motion thereto. Such arrangements are used, for example in the case of shafts driving friction gears, friction couplings and the like, the axial force produced being utilized to press the friction elements into effective engagement.

It is desirable that the said axial force be proportional to the torque transmitted, whatever may be the relative positions of the coupled shafts, and the object of the invention is to enable the achievement of this desirable condition notwithstanding deformation, oscillation, inexact mounting, or the like of the shafts to be coupled.

The invention is characterized by the oscillatory arrangement of the coupling member of at least one of the shafts in such a manner that the shaft or shafts may move in an angular direction relatively to the plane of rotation of the said coupling member. By this arrangement the object in view is achieved since the relative positions of the coupling members are not altered even if the shafts are not in exact alignment.

Two forms of construction of the coupling according to the invention are illustrated, by way of example, in the annexed drawings, in which:—

Figure 1:
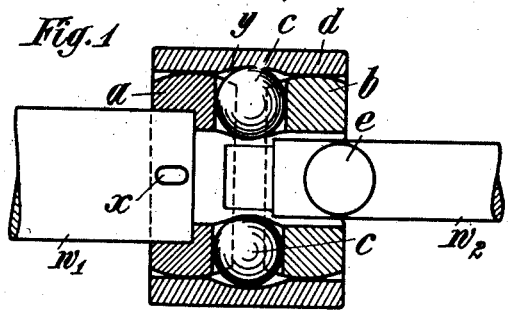
Fig. 1 shows one form of construction in longitudinal section.
Figure 2:
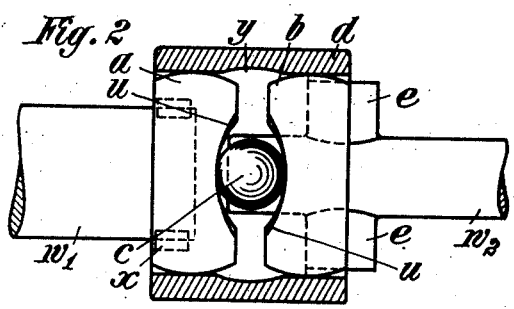
Fig. 2 is a part-sectional plan view of Fig. 1.

Referring first to Figs. 1 and 2, references $w^1$ and $w^2$ designate the shafts to be coupled and $a$ and $b$ discs or rings mounted thereon in the manner hereinafter described; $c$ are balls inserted between said discs, and $e$ pivots on the shaft $w^2$.

The discs $a$ and $b$ are provided on the portions facing one another with helical or inclined or cam-like surfaces formed by recesses or cut-out portions $u$, for example, symmetrically arranged about a line passing through the axes of the shafts as shown in Fig. 2. The inclination of said surfaces may or may not increase constantly on both sides or they may increase to the right or the left to different extents as will be readily understood.

In the embodiment shown the disc $a$ is rigidly secured to the shaft $w^1$ by means of a key or keys $x$ while the disc $b$ is oscillable on the pivots or pins $e$ on the shaft $w^2$. It is obvious that both the discs $a$ and $b$ may be oscillatorily mounted and that the same may be arranged so as to be displaceable in an axial direction. For example, the disc $a$ may be secured in position by a feather key.

The peripheries of the discs $a$ and $b$ are of spherical form, and the whole coupling is surrounded by a sleeve $d$ provided with a groove $y$ forming a ball race which serves as a lateral guide for said sleeve. The sleeve $d$ serves as a radial guide for the balls $c$ and takes up the centrifugal forces exerted by the latter. The balls $c$ may assume the positions shown in Fig. 1, when stationary, due to the slight pressure of the discs thereagainst.

Figure 3:
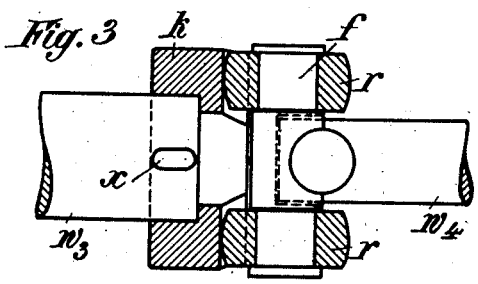
Fig. 3 shows a modified construction in longitudinal section.
Figure 4:
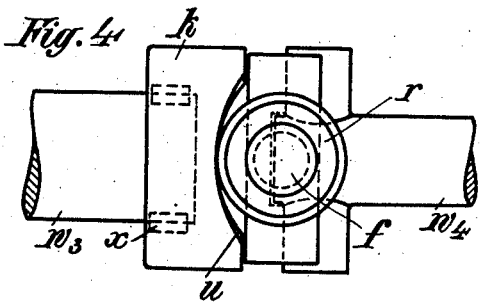
Fig. 4 is a plan view thereof.

In the form of construction shown in Figs. 3 and 4 one disc $k$ only is employed, which disc is secured to the one shaft $w^3$ by means of a key or keys $x$. Inclined surfaces $u$, similar to those shown in Figs. 1 and 2 are provided thereon, on which rollers $r$ operate. Said rollers are pivotally mounted on pins $f$ which are oscillatorily connected to the second shaft $w^4$.

In the example shown the support for the pins $f$ is oscillatorily connected to the shaft $w^4$ by means of pins similar to the pins $e$, but it is obvious that the disc $k$ may be oscillatorily arranged and the said support rigidly connected to the shaft $w^4$.

The operation of the coupling shown in Figs. 1 and 2 is as follows:—

In the event of angular displacements of the shaft axes in the plane of Fig. 1,—such as are caused by elastic deformations, oscillations, or the like, or inexact mounting of the shafts—, the disc $b$ oscillates on the pivots $e$, there being some play between the balls $c$ and the shaft $w^2$ to allow this movement. During axial displacement of the shafts relative to one another the balls c roll upon the curved surfaces of the discs.

In the event of angular displacements of the shaft axes in the plane of Fig. 2 the discs oscillate on the balls c.

The operation of the coupling shown in Figs. 3 and 4 is the same as that shown in Figs. 1 and 2, only in this case the rollers r are displaced upon the disc k during a relative axial displacement of the shafts in the plane of Fig. 3.

What I claim and desire to secure by Letters Patent is:—

1. A shaft coupling comprising a coupling member having a cam-like surface arranged to act in an axial direction and adapted to be secured to one end of a shaft required to be coupled to another, a rolling member co-operating with said cam-like surface, a second coupling member adapted to be acted upon by said rolling member so as to be rotated and at the same time thrust in an axial direction when said first coupling member is rotating, and pivotal means associated with one of said coupling members to permit of angular motion of the shafts to be coupled together with respect to each other.

2. A shaft coupling for two shafts comprising a disc on each shaft, each having a cam-like surface therein; a plurality of balls mounted between the discs and in said surfaces; pivotal means associated with one of said discs adapted to form a pivot for its respective disc; keys on the other shaft for rigidly securing the other disc on its respective shaft; and a sleeve surrounding said discs and balls, said cam-like surfaces and balls coacting to axially displace at least one of the shafts.

3. A shaft coupling for two shafts comprising a disc on each shaft each having a cam-like surface therein; a plurality of balls mounted between the discs and in said surfaces; pivotal means associated with one of said discs adapted to form a pivot for its respective disc; and a sleeve surrounding said discs and balls, said cam-like surfaces and balls coacting to axially displace at least one of the shafts upon transmission of torque.

4. A shaft coupling for two shafts comprising a disc on each shaft each having a cam-like surface therein; a plurality of balls mounted between the discs and in said surfaces; and pivotal means associated with one of said discs adapted to form a pivot for its respective disc, said cam-like surfaces and balls coacting to axially displace at least one of the shafts upon rotation thereof.

5. A shaft coupling for two shafts comprising a disc on each shaft each having a cam-like surface therein; a plurality of rolling members mounted between the discs and in said surfaces; pivotal means associated with one of said discs adapted to form a pivot for its respective disc, said cam-like surfaces and rolling members coacting to axially displace at least one of said shafts upon rotation thereof.

6. A shaft coupling for two shafts comprising a disc on each shaft, each having two circular cam-like surfaces therein; a ball for each groove mounted between the discs and in the surfaces; pivotal means associated with one of said discs adapted to form a pivot for its respective disc; keys on the other shaft for rigidly securing the other disc on its respective shaft; and a sleeve surrounding said discs and balls, said cam-like surfaces and balls coacting to axially displace at least one of the shafts upon rotation thereof.

7. A shaft coupling comprising two shafts, a disc rigid on the end of one of the shafts having a cam-like surface arranged to act in an axial direction, a disc oscillatorily mounted on the end of the other shaft, and rolling members between said discs co-operating with said cam-like surface to produce an axial thrust between said shafts during rotation.

8. A shaft coupling for two shafts comprising a disc on each shaft, each having cam-like surfaces therein; a plurality of rolling members mounted between the discs and in said surfaces; and pins on one of said shafts adapted to form a pivot for its respective disc, said cam-like surfaces and rolling members coacting to axially displace at least one of said shafts upon rotation thereof.

9. A shaft coupling for two shafts comprising a disc on each shaft, each having two cam-like surfaces therein, and the surfaces of each disc facing each other; a ball for each pair of facing surfaces mounted between the discs and in the surfaces; pins on one of said shafts adapted to form a pivot for its respective disc; keys on the other shaft for rigidly securing the other disc on its respective shaft; and a sleeve surrounding said discs and balls, said cam-like surfaces and balls coacting to axially displace at least one of the shafts upon rotation thereof.

10. A shaft coupling for two shafts comprising a disc on each shaft, each having cam-like surfaces therein; a plurality of rolling members mounted between the discs and in said surfaces; and pivotal means associated with said discs said rolling members and cam-like surfaces coacting to axially displace at least one of said shafts upon rotation thereof.

11. A shaft coupling for two shafts comprising a disc on each shaft, each having cam-like surfaces therein; a plurality of balls mounted between the discs and in said surfaces; and pivotal means associated with said discs, said rolling members and cam-like surfaces coacting to axially displace at least one of said shafts upon rotation thereof.

12. A shaft coupling for two shafts comprising a disc on each shaft, each having a cam-like surface therein; a rolling member for the surfaces mounted between the discs; and pivotal means associated with said discs, said rolling members and cam-like surfaces coacting to axially displace at least one of said shafts.

In testimony whereof I have affixed my signature.

WILHELM STOECKICHT.